March 21, 1950     A. B. CARMICHAEL     2,501,027
CAMP-CAR

Filed Jan. 3, 1947     4 Sheets-Sheet 1

INVENTOR.
Asa B. Carmichael
BY
McMorrow, Berman & Davidson
Attorneys

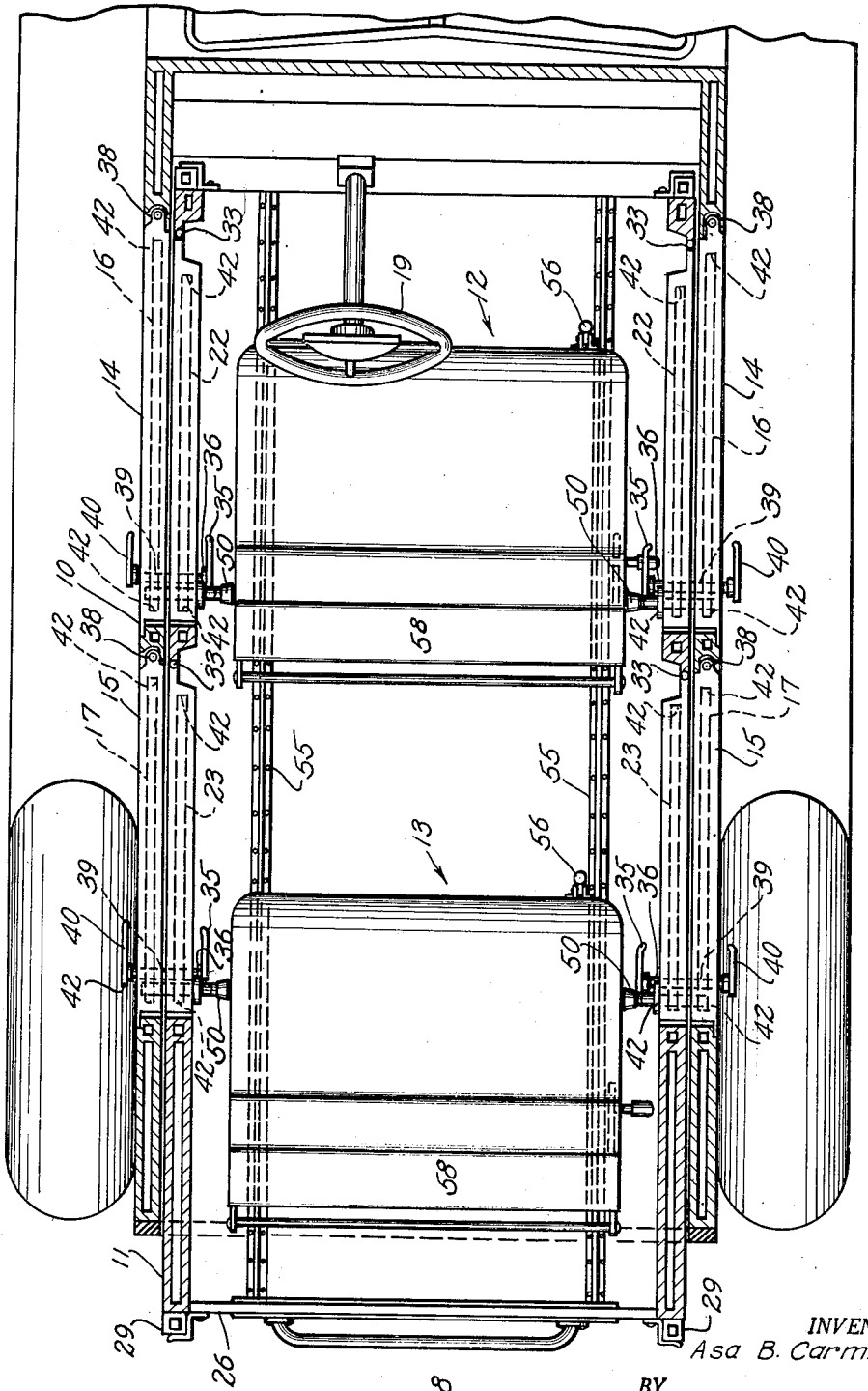

March 21, 1950     A. B. CARMICHAEL     2,501,027
CAMP-CAR
Filed Jan. 3, 1947     4 Sheets-Sheet 3
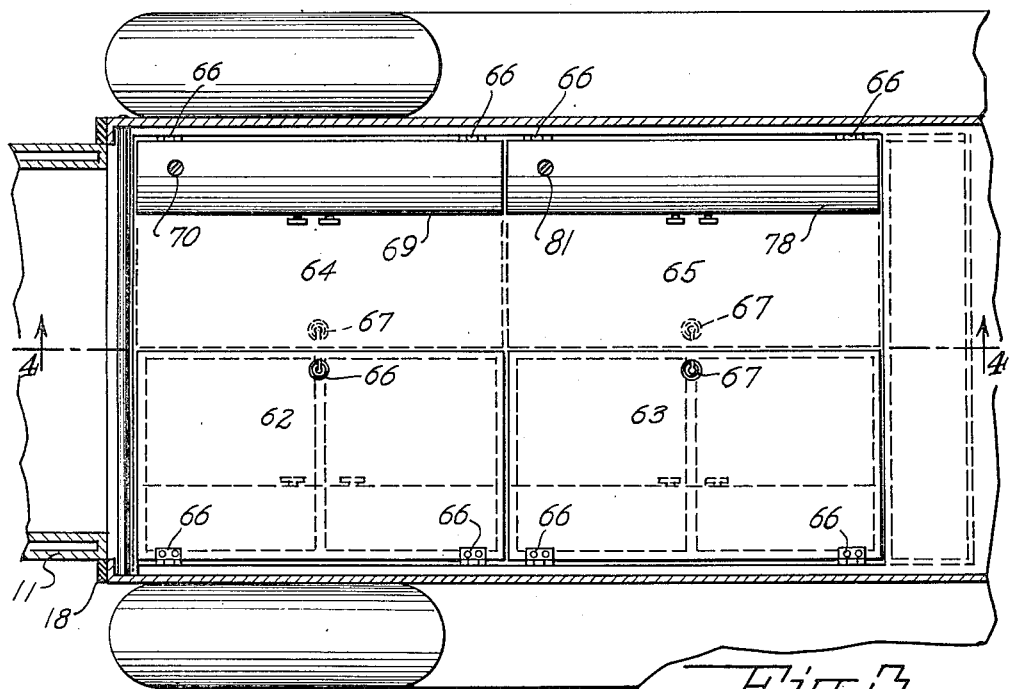
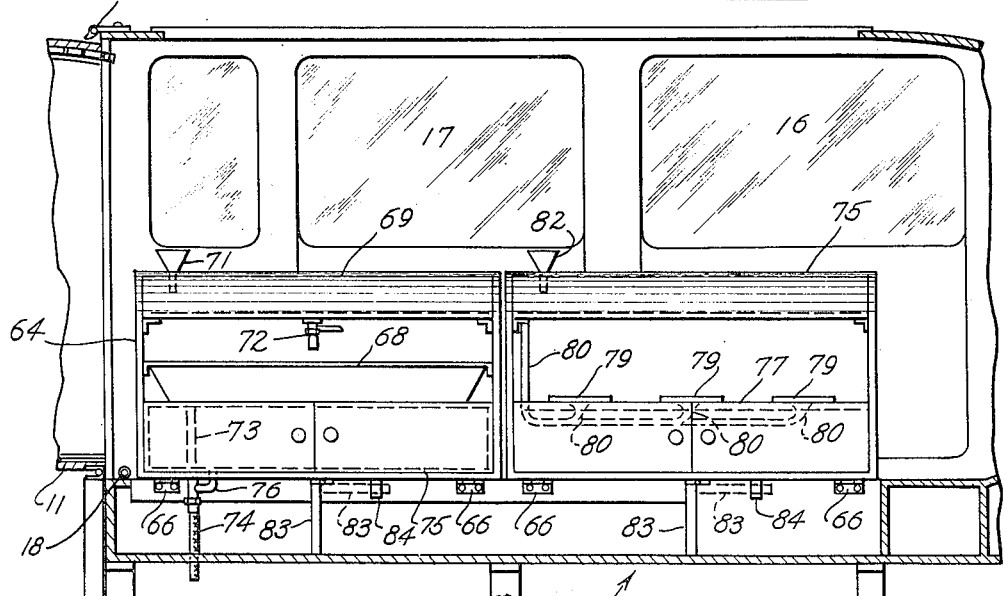
INVENTOR.
Asa B. Carmichael
BY
McMorrow, Berman & Davidson
Attorneys March 21, 1950     A. B. CARMICHAEL     2,501,027
CAMP-CAR
Filed Jan. 3, 1947     4 Sheets-Sheet 4
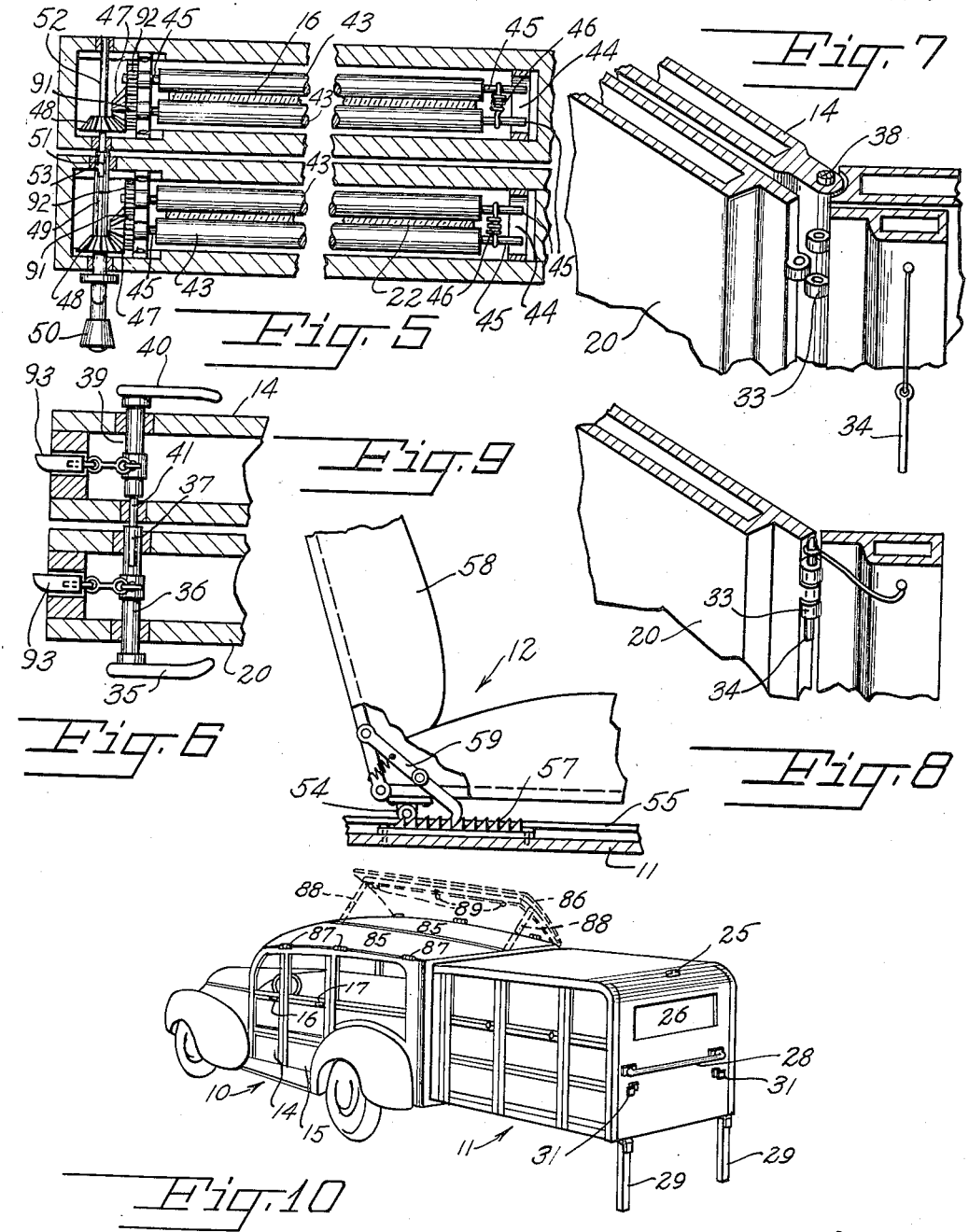
Inventor
Asa B. Carmichael
By McMorrow, Berman and Davidson
Attorneys Patented Mar. 21, 1950

2,501,027

UNITED STATES PATENT OFFICE 2,501,027

CAMP CAR

Asa B. Carmichael, Tujunga, Calif.

Application January 3, 1947, Serial No. 720,088

5 Claims. (Cl. 296—23)

My invention relates to automobiles, and more particularly to automobiles adapted to be used for camping purposes.

The object of my invention is to provide an automobile having an outer body and an inner body adapted to be pulled out of the outer body to serve as a tent or the like.

Another object of my invention is to provide an automobile of the character indicated above, the outer body whereof is provided with collapsible equipment such as cupboards, sink, water tank, cooking plate and gas tank therefor, etc., adapted to be raised into operative position after the inner body has been removed from the outer body.

The main object of my invention is to provide an automobile affording all the conveniences and advantages of a trailer outfit without the disadvantages inherent in traveling with and driving an automobile having a trailer hitched thereto.

Other objects of my invention may appear in the following specification describing my invention with reference to the accompanying drawings illustrating a preferred embodiment of my invention.

It is, however, to be understood that my invention is not to be limited or restricted to the exact construction and combination of parts described in the specification and shown in the drawings, but that such changes and modifications can be made which fall within the scope of the claims appended hereto.

In the drawings:

Figure 2 is a sectional view taken on line 2—2 in Figure 1.

Figure 3 is a sectional view taken on line 2—2 in Figure 1 after the inner body has been moved rearwardly out of the outer body and a part of the collapsible equipment of the outer body has been arranged in operative position.

Figure 4 is a sectional view taken on line 4—4 in Figure 3.

Figure 5 is a fragmentary horizontal cross sectional view through a window construction, while the inner body is located inside the outer body.

Figure 6 is a fragmentary horizontal sectional view showing the lock construction on the doors.

Figure 7 is a fragmentary perspective view showing the hinge construction on the doors, when the inner body is arranged inside the outer body.

Figure 8 is a fragmentary perspective view showing the arrangement of the hinges on the doors of the inner body after it has been pulled out of the outer body.

Figure 9 is a fragmentary elevational side view of one of the seats in the inner body.

Figure 10 is a perspective view of an automobile according to my invention, the inner body being shown in position outside of the outer body, and the trap doors on top of the outer body being indicated in open position in dotted lines.

Figure 1:
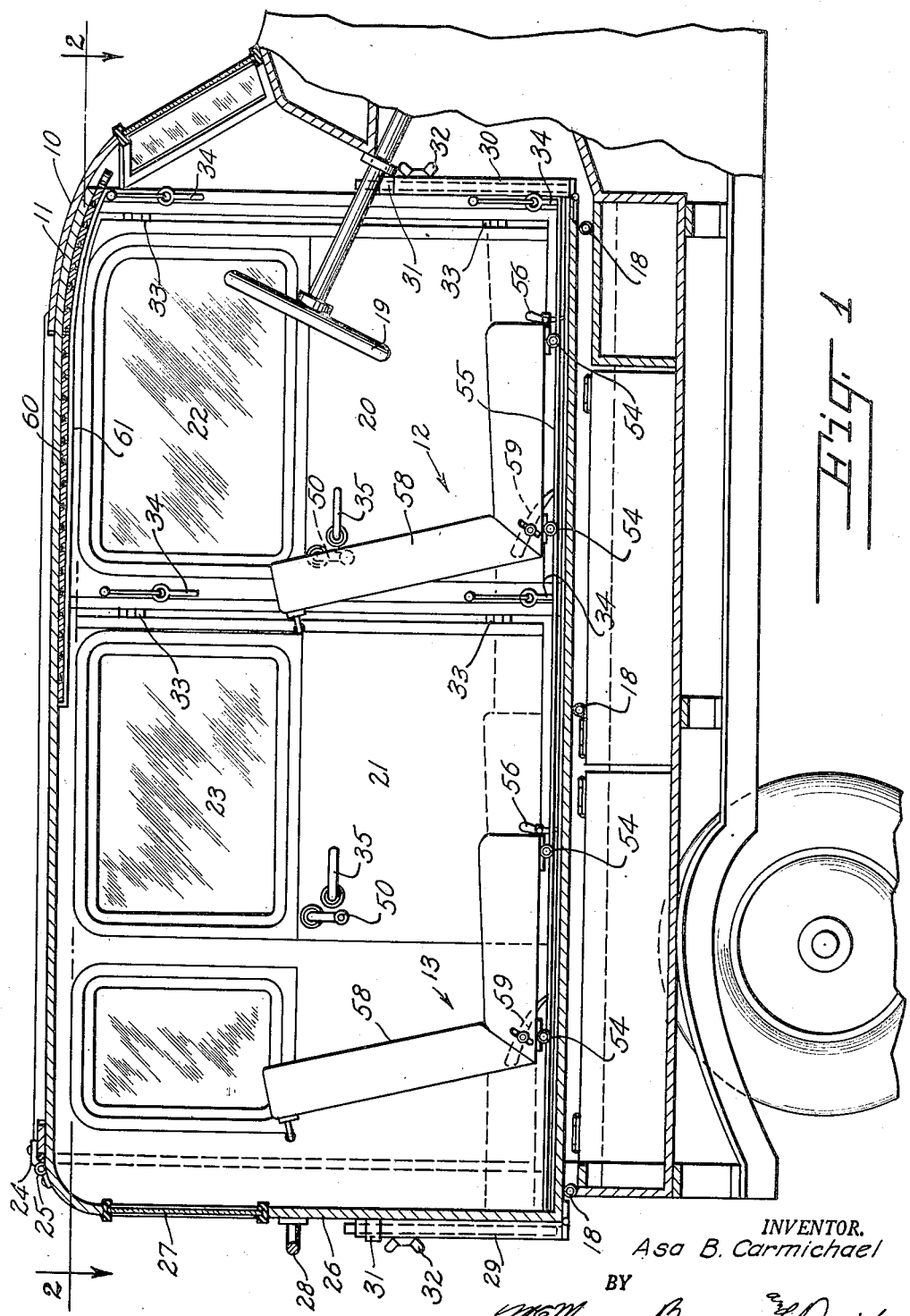
Figure 1 is a fragmentary longitudinal sectional view of an automobile according to my invention.

Referring now in detail to the drawings, the camping automobile forming the subject matter of my invention comprises an automobile having an outer body 10 and an inner body 11. The inner body 11 is slidably arranged inside the outer body 10, which is preferably constructed in the shape of a station wagon. It is, however, to be understood that an auto built as a sedan may be used. The inner body 11 is preferably made from Duralumin or any similar strong and light material. It contains an upholstered front seat 12 and an upholstered rear seat 13.

The outer body 10 is equipped with the usual front and rear doors 14 and 15, respectively, and the usual windows 16 and 17.

The rear wall of the outer car body 10 is omitted, and on the floor of this body a plurality of rollers 18 is rotatably arranged, on which the inner car body 11 is slidably supported.

Steering wheel 19 and all other usual driving apparatus including motor and so forth are installed in the outer body.

The inner body 11 is provided with front doors 20, rear doors 21, front windows 22 and rear windows 23, all of which are so arranged that they coincide with the corresponding doors and windows of the outer car body 10 when the inner body is in driving position, which means when it is arranged inside the outer car body 10.

A spring latch 24 is provided on top and at the rear of the outer car body 10 and engages a lug 25 on top and at the rear of the inner car body when the latter is located inside the former, and secures the inner body 11 against accidental sliding movement.

The inner car body 11 has a rear wall 26 provided in its upper portion with a window 27. On the lower portion of this rear wall 26 a transverse handle bar 28 is secured by means of which the inner car body 11 can be pulled rearwardly out of the outer car body 10. When the inner body 11 is positioned inside the outer body 10, the rear wall 26 of the inner body serves also as the rear wall of the outer body.

On each lower rear corner of the inner car body 11 a leg or support bar 29 is pivotally mounted so that it can be swung downwardly to support the rear end of the inner body 11 when this body is pulled out of the outer body 10 so far that the front end rests on the rear end of the outer body 10, as shown in Figure 10.

As described later, the camp-car according to my invention is divided into two rooms, when arranged in this manner, the inner body serving as a bed room and the outer body as a kitchen.

If it should be desired to leave the inner body 11 at the camping place, while using the outer body for side-trips, or other purposes, the inner body is removed entirely from the outer body, and two front support bars 30 pivotally secured to the lower front corners of the inner body are swung downwardly to support the front end of the inner body 11.

Spring clamps 31 are provided on the front and rear of the inner body 11 to engage and secure the support bars 29 and 30 in upward or inoperative position.

Preferably these support bars 29 and 30 consist of a square hollow portion and a square bar slidably arranged inside the hollow portion and adapted to be fastened in adjusted position relative to said hollow portion by means of a wing screw 32 in the hollow portion.

The front and rear doors 20 and 21 of the inner car body 11 are pivotally mounted on said body by hinges 33 having removable pintles 34 suspended on the walls of the body 11 when removed from the hinges 33.

Each door 20 or 21 of the inner body 11 has a spring lock 93 adapted to be operated by a handle 35 connected to a latch-operating bar 36 being rotatably mounted in the door. The outer portion of this latch-operating bar 36 is provided with a polygonal, axially extending blind hole 37.

When the inner car body 11 is removed from the outer body 10, a spare handle (not shown) having a polygonal shank is fitted into the blind hole 37 to open the door from outside. The doors of the outer body 10 are secured to this body by hinges 38 and have spring locks 39 connected with latch-operating bars 39, on the outer ends of which door handles 40 are secured. The latch-operating bars 39 have on their inner ends polygonal shanks 41 adapted to fit into the blind holes 37 in the latch operating bars 36 of the inner door lock. Of course, sufficient clearance exists between the polygonal holes 37 and the corresponding polygonal shafts 41 to break the connection between the two when an outer door is opened.

It is understood that spare door handles (not shown) having polygonal holes in their shanks are fitted onto the shanks 41 of the outer door locks when the two bodies are separated.

When the inner body 11 is located in the outer body 10, the polygonal shanks 41 of the outer door locks are fitted into the blind holes 37 in the inner door locks and the hinge pintles 34 are removed from the hinges 33 of the inner doors 20 and 21, as shown in Figures 6 and 7, so that the corresponding outer and inner doors temporarily secured together in any manner and by any means known in the art can be opened and closed simultaneously by using only one door handle 35 or 40.

The front and rear windows of the inner and outer doors are manipulated in the following manner. The window panels are slidably arranged in vertical guide slots 42. At the bottom of these guide slots a pair of rubber-coated rollers 43 is rotatably located in transverse slots 44 provided in each inner and outer door so that between each pair of rollers one of the window panes is located. On each end of each roller a centrally located and axially extending pin 45 is provided supporting the roller 43 in the transverse slot 44. One pair of oppositely arranged pins 45 of each pair of rollers 43 is engaged by a coil spring 46 urging said rollers into engagement with the window pane between them. On one pin 45 of the other pair of pins a bevel gear 47 is rigidly mounted, with a spur gear or pinion 91 fixed behind it and meshing with a spur gear 92 on the other of the latter pair of pins. The mentioned bevel gear meshes with another bevel gear 48. The bevel gear 48 of each inner window is rigidly mounted on a shaft 49 rotatably supported by the inner door and having on its inner end a crank lever 50. On its outer end, the shaft 49 is provided with a polygonal blind hole 51. The bevel gear 48 in the outer window is rigidly mounted on a shaft 52 rotatably mounted in the outer door and has an inwardly extending, axially arranged, polygonal shank 53 adapted to fit in and engage the polygonal hole 51.

In this manner, the corresponding inner and outer windows can be opened and closed simultaneously when the inner car body 11 is positioned inside the outer body 10. At the same time, the connections between the inner and outer shafts 49 and 52 and between the latch operating bars 36 and 39 serve as additional locks to secure the inner body 11 in its position inside the outer body. When the inner body 11 is to be removed from the outer body, the connection between the two shafts 49 and 52 is broken and after the inner body is removed, reserve crank levers (not shown) are secured on the outer shafts 52 to manipulate the rollers 43, which in turn raise or lower the window panes between them.

The upholstered seats 12 and 13 are mounted on small wheels 54 adapted to travel on rails 55 fastened onto the floor of the inner body 11.

On the front of each seat, a spring-biased pawl 56 is provided engaging normally a ratchet 57 on the inner body floor to prevent accidental movement of the seats. Each seat has a back rest 58 hingedly connected therewith. A spring-biased pawl 59 adapted to engage the ratchet 57 secures the back rest in adjusted position relative to the seat.

When the inner body 11 is to be used as a bed-room, the first-mentioned pawls 56 are disengaged from the ratchet 57 and the seats are rolled forward. Then the second pawls 59 are disengaged from the ratchet 57 and the back rest 58 is pivoted backward, so that the two seats and the back rests are located all in one level forming a comfortable bed.

To close the front of the inner body 11 when it is entirely removed from the outer car body 10, a flexible door 60 of any well-known construction is arranged so that it can be pushed upwardly when it is not in use, where it is held by a closed track 61 of well known construction.

When the inner body 11 is pulled out of the outer body 10, the latter is adapted to be used as a kitchen.

For this purpose, a false floor of the outer body 10 is divided longitudinally and transversely so that four parts 62, 63, 64 and 65, respectively, are formed, each of which is connected with the frame of the inner body by means of hinges 66 arranged on the respective outer longitudinal edge of the floor portions, each of which is provided with a grip ring 67 whereby it can be swung upwardly.

On the false floor 64 a sink 68 is secured which extends horizontally when the floor portion 64 is in upward position. Above the sink 68 a water tank 69 is located having an inlet normally closed by a screw plug 70, but adapted to be opened and to be equipped with a funnel 71. The water tank 69 is provided with a spigot 72, permitting water from the tank 69 to flow in the sink 68 from which it can be drained through a drain pipe 73 connected with a flexible pipe 74 leading through the floor of the outer body 10. Underneath the sink 68 an ice box 75 is arranged having a drain pipe 76 communicating with the drain pipe 73 of the sink 68.

On the false floor portion 65 is a gas plate 77 arranged extending horizontally when the false floor portion 65 is in an upward position. Above the gas plate a fuel tank 78 which may be equipped to contain and dispense butane gas, if desired, is secured to the false floor portion 65 and is connected with the burners 79 of the gas plate by means of pipes 80. The gas tank 78 is provided with an inlet commonly closed by a screw plug 81, but adapted to be opened and to be equipped with an inlet funnel 82.

On the other two false bottom portions 62 and 63 drawers and cupboards (not shown) may be arranged to provide additional storing space. On each of these installations a support 83 is pivotally secured adjacent the central portion of the front edge of the lowest part of the installation.

Normally, these supports are arranged to be located flatly against the bottom of the respective installation and each support 83 is secured in this position by a spring clip 84 on the bottom of the installation. However, when the installations are arranged in operative positions, each support is swung downwardly to engage the floor of the outer body 10 to secure the respective installations in operative position.

In order to enable the outer body 10 to be aired while it is being used as a kitchen, and to give more space for a person to stand upright therein while working, the top of the outer body is composed of two longitudinal halves 85 and 86, the latter of which is constructed to overlap the front edge of the former when the top is in closed position. Each top half is hingedly secured to the body as indicated at 87, and jointed braces 88 are provided to secure the top halves in open position.

On the under side of these top halves bolts 89 are arranged adapted to lock the top halves to prevent unwarranted opening thereof.

Having described my invention, I claim as new and desire to secure by Letters Patent:

1. In a camping automobile comprising an outer car body equipped with conventional driving mechanism and having the rear end open, an inner movable car body telescoped into the outer car body and closing the rear end of the latter, said inner body being rearwardly movable out of said outer body, doors in the sides of the outer car body with locks and operating handles disposed upon the exterior portions of the doors for operating said locks and opening said doors at will, the features including further doors in the sides of the inner car body substantially co-extensive with the doors in the outer car body when said inner car body is telescoped into the latter in such fashion as to result in co-extensive pairs of doors, further locks upon the further doors with handles upon the inner sides of the latter for operating the further locks and opening said further doors, and connections between the locks upon the doors of said outer car body and the further locks upon the further doors of said inner car body effective to cause the handle upon either door in each co-extensive pair to operate both locks upon both doors in the pair and thereby open them simultaneously.

2. In a camping automobile comprising an outer car body equipped with conventional driving mechanism and having the rear end open, an inner movable car body telescoped into the outer car body and closing the rear end of the latter, said inner body being rearwardly movable out of said outer body, doors in the sides of the outer car body with locks and operating handles disposed upon the exterior portions of the doors for operating said locks and opening said doors at will, the features including further doors in the sides of the inner car body substantially co-extensive with the doors in the outer car body when said inner car body is telescoped into the latter in such fashion as to result in co-extensive pairs of doors, further locks upon the further doors with handles upon the inner sides of the latter for operating the further locks and opening said further doors, the doors in both car bodies having window openings therein, window panes in all of the doors vertically movable to close and open said openings, manually operated means accessible upon the outer sides of the doors of said outer car body for raising and lowering the window panes in the latter doors, further manually operated means accessible upon the inner sides of the doors of said inner car body for raising and lowering the window panes of the latter doors, and means interconnecting the manually-operated means upon one door in each co-extensive pair with the manually operated means upon the other door in the pair for causing simultaneous operation of the manually operated means upon both doors in each pair when either of said manually operated means upon one of the doors is operated in order to raise and lower the window panes upon both doors in the pair simultaneously.

3. In a camping automobile comprising an outer car body equipped with conventional driving mechanism and having the rear end open, an inner movable car body telescoped into the outer car body and closing the rear end of the latter, said inner body being rearwardly movable out of said outer body, doors in the sides of the outer car body with locks and operating handles disposed upon the exterior portions of the doors for operating said locks and opening said doors at will, the features including further doors in the sides of the inner car body substantially co-extensive with the doors in the outer car body when said inner car body is telescoped into the latter in such fashion as to result in co-extensive pairs of doors, further locks upon the further doors with handles upon the inner sides of the latter for operating the further locks and opening said further doors, shanks rigid with the handles upon both doors in each co-extensive pair, the shank of the handle on one door in each pair having a polygonal blind hole forming a socket therein and a corresponding polygonal stem upon the shank of the handle on the other door in each pair extending removably into the blind hole or socket of said one door in each pair and effective to cause the handle upon either door in each co-extensive pair to operate both locks upon both doors in the pair and thereby open both doors simultaneously.

4. In a camping automobile comprising an outer car body equipped with conventional driving mechanism and having the rear end open, an inner movable car body telescoped into the outer car body and closing the rear open end of the latter, said inner body being rearwardly movable out of said outer body, doors in the sides of the outer car body, hinges connecting the doors with the sides of the latter, the features including further doors in the sides of the inner car body which are substantially co-extensive with the doors of the outer car body when the inner car body is telescoped forwardly into the outer car body, further hinges connecting the further doors with the sides of said inner car body, removable pintles in said further hinges, and means interconnecting the doors of the outer car body with those co-extensive therewith upon the inner car body to form co-extensive pairs of doors in such fashion as to be effective to cause the inner door in each pair to open and close with the outer door of the pair when the pintles of the hinges of the inner door in each said pair are removed.

5. In a camping automobile comprising an outer car body equipped with conventional driving mechanism and having the rear end open, an inner movable car body telescoped into the outer car body and closing the rear open end of the latter, said inner body being rearwardly movable out of said outer body, a floor fixed in the outer car body, the features which include a plurality of elongated panels forming a false floor in said outer car body spaced a distance above the fixed floor thereof, and hinges connecting one longitudinal edge of each elongated panel with the interior of said outer car body to allow swinging up each panel from horizontal position in which it serves as a portion of said false floor to another position in which the underside of the panel is exposed to view in said outer car body and is adapted to carry a sink or other piece of household equipment and thus expose the latter in accessible position within said outer car body.

ASA B. CARMICHAEL.

REFERENCES CITED

The following references are of record in the file of this patent:

UNITED STATES PATENTS

| Number | Name | Date |
|---|---|---|
| 467,423 | Merritt | Jan. 19, 1892 |
| 525,906 | Johnson | Sept. 11, 1894 |
| 1,460,464 | Wilson | July 3, 1923 |
| 1,668,167 | McKenna | May 1, 1928 |
| 1,864,047 | Lawhorne | June 21, 1932 |
| 1,882,304 | Sipe | Oct. 11, 1932 |
| 1,972,415 | Anderson | Sept. 4, 1934 |
| 2,094,908 | Thrall | Oct. 5, 1937 |
| 2,136,130 | Gorlenko | Nov. 8, 1938 |
| 2,166,911 | Little | July 18, 1939 |
| 2,225,319 | Rollo | Dec. 17, 1940 |
| 2,408,132 | Weeks | Sept. 24, 1946 |

FOREIGN PATENTS

| Number | Country | Date |
|---|---|---|
| 230,343 | Germany | Jan. 23, 1911 |
| 319,933 | Great Britain | Oct. 3, 1929 |
| 333,784 | Great Britain | Aug. 21, 1930 |
| 424,791 | Great Britain | Feb. 28, 1935 |